United States Patent [19]
Takahashi et al.

[11] Patent Number: 5,197,097
[45] Date of Patent: Mar. 23, 1993

[54] CELL SIGNAL PROCESSING CIRCUIT AND OPTICAL SWITCH APPARATUS USING THE SAME

[75] Inventors: Yasushi Takahashi, Hachioji; Eiichi Amada; Kimiaki Ando, both of Tokyo; Masanori Miyata, Hachioji, all of Japan

[73] Assignee: Hitachi, Ltd., Tokyo, Japan

[21] Appl. No.: 638,577

[22] Filed: Jan. 7, 1991

[30] Foreign Application Priority Data

Jan. 10, 1990 [JP] Japan ................................ 2-001505

[51] Int. Cl.⁵ ........................ H04K 1/02; H04J 3/24; H04Q 11/04
[52] U.S. Cl. ..................................... 380/6; 380/49; 380/50; 380/54; 370/60; 370/94.1
[58] Field of Search ................ 364/200, 900; 380/6, 380/9, 49, 50, 54; 370/1, 60, 94.1; 375/118

[56] References Cited

U.S. PATENT DOCUMENTS

| | | | |
|---|---|---|---|
| 4,501,000 | 2/1985 | Immink et al. | 375/25 |
| 4,947,388 | 8/1990 | Kuwahara et al. | 370/60 |
| 4,961,188 | 10/1990 | Lau | 370/94.1 X |
| 4,969,149 | 11/1990 | Killat et al. | 370/60 |
| 4,995,032 | 2/1991 | Demichelis et al. | 370/60 |
| 5,007,070 | 4/1991 | Chao et al. | 375/118 |
| 5,086,467 | 2/1992 | Malek | 380/6 |

OTHER PUBLICATIONS

Amada et al, "A Packet Switch Architecture Using an Optical Switch Array".
Society for Technological Research of Electronics, Information and Communication Academy, SSE88-95, pp. 25-30, (1988).
Proceedings of the 1989 Bipolar Circuits & Technology Meeting, "A Chipset for Gigabit Rate", by R. C. Walker, Sep. 18-19, 1989, pp. 288-290.
Proceedings, IEEE Global Telecommunications Conference, "A Photonic Approach to ATM Switching", by E. Amada, et al., Nov., 27-30, 1989, vol. 3, Dallas, Tex., pp. 1810-1814.
IBM Technical Disclosure Bulletin, "Charge Constrained Byte-Oriented (0.3) Code", by A. M. Patel, vol. 19, No. 7, Dec. 1976, New York, N.Y., pp. 2715-2717.
Technical Digest IEEE Gallium Arsenide Integrated Circuit Symposium, "10Gb/s Packet Switching Using Custom and Commercial GaAs ICs", by K. Grimble, et al., San Diego, Calif. Oct. 22-25, 1989, pp. 23-26.
Proceedings of the Annual International Phoenix Conference On Computers and Communications, "A Digital Interface to a One Gigabit/sec Multiple-Access Figer-r-Optic Network", by Y. Ofek, et al., Feb. 25-27, 1987, Scottsdale, Ariz., pp. 134-139.

Primary Examiner—Bernarr E. Gregory
Attorney, Agent, or Firm—Antonelli, Terry, Stout & Kraus

[57] ABSTRACT

A cell signal processing circuit is provided which is capable of precisely extracting a timing signal and a cell synchronizing signal. The cell signal processing circuit is principally composed of a signal adder circuit for adding a dummy signal comprising bit signals in a direct current balanced state to an end portion of respective inputted time series cell signals, and a separator circuit for separating and outputting the time series cell signals. Each dummy signal being composed of the same number of bits "0" and "1" is added to input signals in the form of time series cells such that signal cells are exchanged at a time of a bit "0" in the dummy signal. An optical switch apparatus using the cell signal processing circuit as an optical switch array is also provided which includes a photoelectric converter for converting the time series optical cell signal to an electric signal, a clock recovery circuit for extracting a clock signal from an output from the photoelectric converter, a cell synchronization circuit for extracting a cell synchronizing signal from the output from the photoelectric converter, and a decision circuit for deciding between signals in the output from the photoelectric converter by the use of the clock signal. The optical switch apparatus of the invention is simple and is not influenced by data loss and jitter.

12 Claims, 8 Drawing Sheets

FIG. 6A DECISION CIRCUIT OUTPUT i

FIG. 6B CELL SYNCHRONIZING SIGNAL h

FIG. 6C INPUT TO DEMULTIPLEXER j

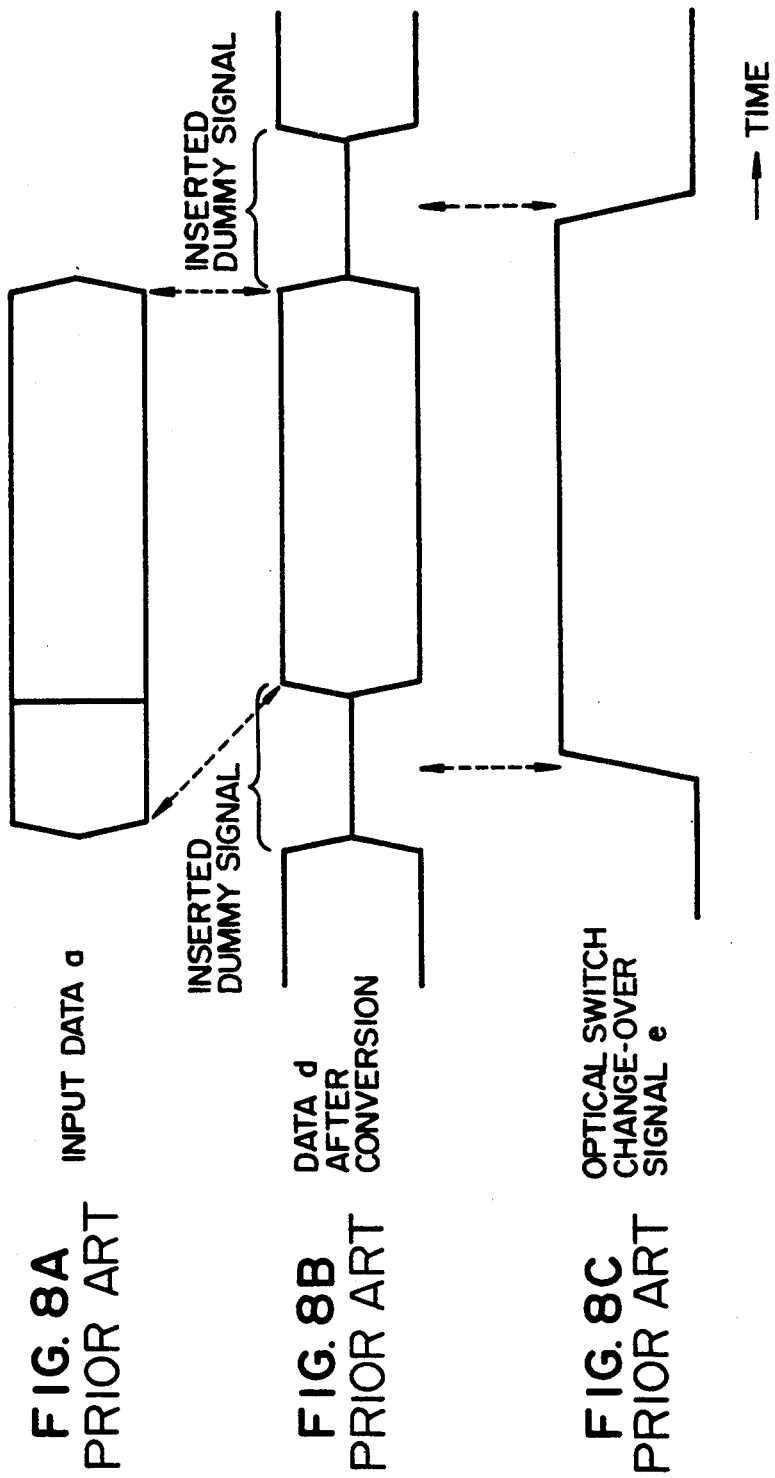

CELL SIGNAL PROCESSING CIRCUIT AND OPTICAL SWITCH APPARATUS USING THE SAME

BACKGROUND OF THE INVENTION

The present invention relates to a cell signal processing circuit and an optical switch apparatus using the same, and in more detail, to a processing circuit which processes input signals divided into cells each including a constant number of bits in a time series and an optical switch apparatus composed of the processing circuit, particularly a structure of a timing recovery and cell synchronization unit.

An asynchronous transfer mode (ATM) is regarded as a future wide band switching system, wherein a signal is divided into constant bit number units each referred to as a "cell", to which information indicative of a destination or the like called "header" is added at the head thereof, and a switch array decodes the header and distributes respective cells to respective destinations to thereby perform a switching operation. For a high speed switching of such cells, utilization of a wide band and a high speed possessed by optical features is thought to be effective.

For example, "A Photonic Approach to ATM Switching" by Amada et al presented at Global Telecommunications Conference '89 (GLOBECOM '89), No. 50.2, Dallas, Tex., November, 1989 and "A Packet Switch Architecture Using An Optical Switch Array" by Amada, et al. published in documents of Society for Technological Research of Electronics, Information and Communication Academy, SSE88-95, 1988, pp. 25-30 has realized an optical ATM apparatus by using an optical switch array in a switching stage.

Since it is difficult to realize functions, such as a memory function for buffering cells and a logical processing function for processing the header, of the above-mentioned ATM switch apparatus by present optical devices, an optical switching stage (optical switch array) 8 only is composed of an optical device, and an electric-photo converter 6 and an photoelectric converter 9 are respectively provided to input and output sections thereof such that the remaining arrangement is formed by electric circuits as shown in FIG. 7. Specifically, as shown in FIG. 8A, an electric input signal a in a cell time series is once stored in an input buffer 3 and waits for a switch control. When a read permission is issued, data is read from the input buffer by a signal from a read control unit 2, and converted to an optical signal by an electric-photo converter 6 to constitute an optical input signal to the optical switch array 8. Since the optical switch array 8 is not provided with a memory function, data is lacked when the optical switch 8 is changed over. To prevent this data loss, a dummy signal (non-signal condition) is added between adjacent cells before the cell signals are converted to optical signals, as shown in FIG. 8B. The optical switch array 8 is changed over by an optical switch driving signal, the change-over timing of which is located at a substantial center of the dummy signal, as shown in FIG. 8C, to thereby prevent loss of data signals to be exchanged.

An optical signal outputted from the optical switch array 8 is converted to an electric signal by the photoelectric converter 9 on an output port side, once stored into an output buffer 22 and then outputted in accordance with a control signal from a read control unit 23. For this reason, a bit drop never occurs in signals to be exchanged except for the dummy signals, that is, in the cells.

It is necessary to provide an actual apparatus with a decision circuit, a clock (timing) recovery circuit, a cell synchronization circuit and the like on the output side of the optical switch array 8 prior to the input of the output buffer 22. A phase matching is important, particularly for a high speed signal processing. If cell synchronizing signals are individually formed and distributed to a plurality of output sections of a switch array, the phase matching is quite difficult. A simultaneous transmission by the use of a wavelength multiplex or the like requires a wavelength exclusively assigned thereto and optical parts such as a wavelength filter, which results in an increase of an insertion loss. For this reason, it is necessary to extract the cell synchronizing signals from the output of the switch array.

The identification circuit is adapted to extract a clock signal from an electric signal by the clock recovery circuit and comprises a circuit which performs a decision and reshaping by means of a decision for regenerating the foregoing amplified electric signal with the clock signal used as a decision timing. In this structure, the identifier and the amplifier are connected so as to block direct current components.

The above-mentioned conventional technology does not particularly consider the dummy signal with respect to a signal form. For this reason, an ordinary photoelectric conversion unit, if used, may cause loss of the dummy signal, which incurs problems when a signal decision and a timing recovery are performed on the output side. The first problem is that signal loss causes fluctuations in a mark density of received data, which leads to a deterioration in a decision sensitivity. The second problem is that the timing recovery circuit may possibly malfunction due to a changing point of a signal level caused by the signal loss.

SUMMARY OF THE INVENTION

It is a principal object of the present invention to provide a cell signal processing circuit which is capable of precisely extracting a timing signal and a cell synchronizing signal and an optical switch apparatus using the same.

To achieve the above object, the present invention provides a cell signal processing circuit which processes input signals in a cell form, wherein means for adding a unique signal pattern including the same number of bits "0" and bits "1", that is, a direct current balanced signal (also referred to as a dummy signal) to each cell of input signals is provided in an input section thereof, such that the cell signal processing circuit drives the optical switch at a time of a bit sequence of "0"s included in the unique signal pattern.

Also, an optical switch apparatus is composed of the above signal processing circuits as an optical switch array and also comprises means for detecting the particular signal for reproducing a cell synchronizing signal at an output section of the optical switch apparatus and means for generating the cell synchronizing signal by the use of an output from the detecting means.

The dummy signal is in a direct current balanced state, that is, it exhibits a mark density of 0.5. Also, since an input signal cell is generally scrambled, such scrambled part as well as the entire input signal cell exhibit a mark density of 0.5. Thus, there is substantially no direct component, whereby any problem will be incurred even if a decision circuit is alternate current coupled.

Since the optical switch array is changed over at a time of a "0" bit pattern in the added dummy signal, an optical signal level at a transition is zero, whereby a temporary data loss due to a transition, even if produced, neither a change in the mark ratio nor an increase in signal level changing points will arise. Since unnecessary signal level changing points are not increased, it is possible to prevent the clock reproducing circuit from malfunctioning, which renders it possible to employ an ordinary optical receiver on the output port side. Further, the optical switch array is changed over at a time of the "0" bit pattern, a temporary data drop due to a change-over, even if produced, will not cause any problem on the output side of the optical switch array.

On the output port side, a cell switching cycle frequency is extracted by a nonlinear processing or the like and waveform-shaped to generate a square wave which is delayed by an appropriate time period and employed as a cell synchronizing signal. Since this cell synchronizing signal is extracted from a received optical signal, it is in phase with the received cell. A phase difference between input ports naturally appears to be a jitter, however, the phase difference is averaged by a circuit for extracting a cell switching cycle frequency so that the jitter will not influence largely. It is also possible to generate the cell synchronizing signal from a particular pattern by a logical circuit.

BRIEF DESCRIPTION OF THE DRAWINGS

FIGS. 8A to 8C are timing charts showing the operation of the prior art optical switch apparatus shown in FIG. 7.

DESCRIPTION OF THE PREFERRED EMBODIMENTS

Figure 1:
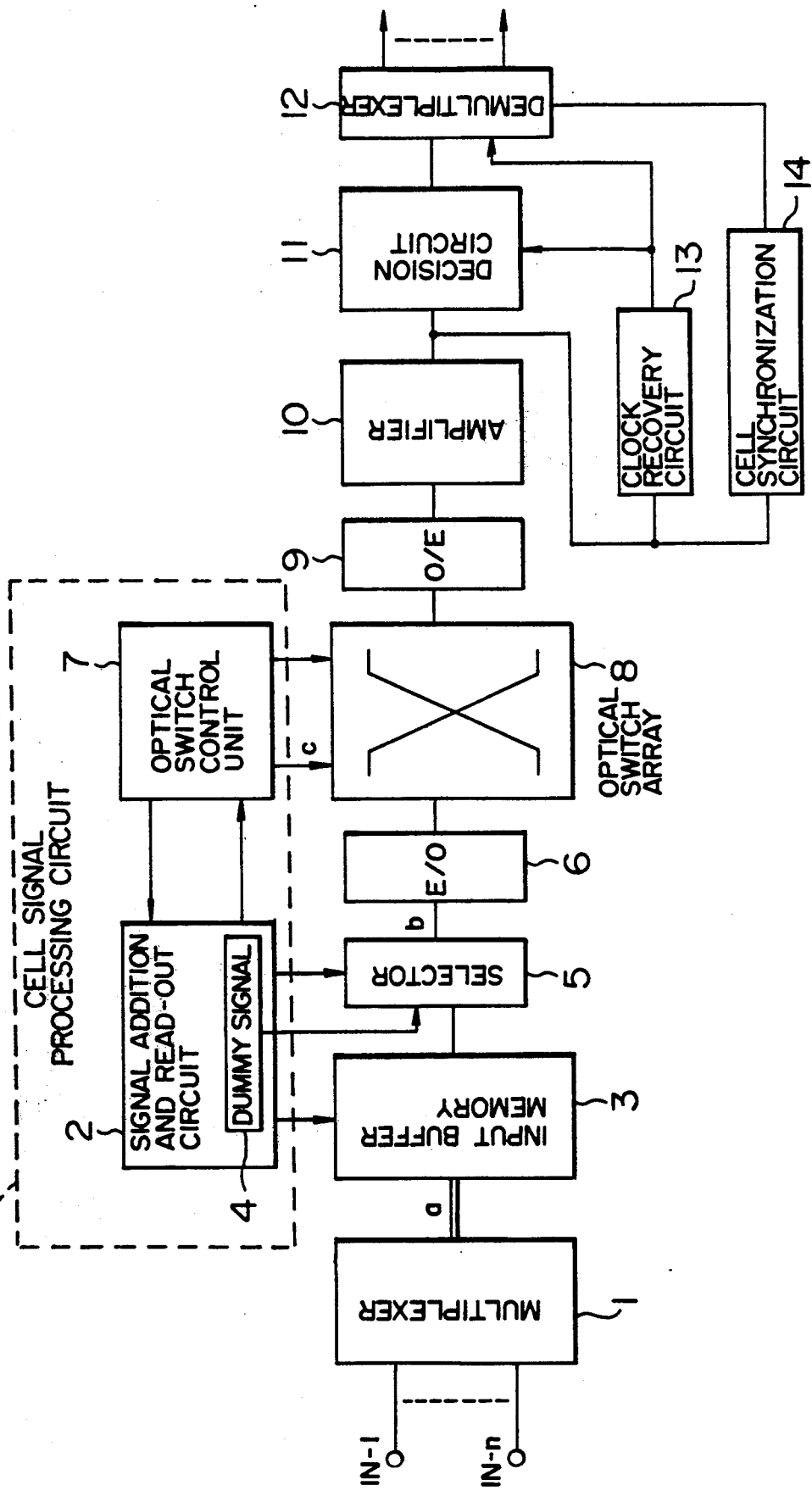
FIG. 1 is a block diagram showing an embodiment of an optical switch apparatus according to the present invention.

An embodiment of the present invention will hereinafter be explained with reference to the accompanying drawings. FIG. 1 is a block diagram showing a structure of an embodiment of an optical switch apparatus according to the present invention. The present embodiment provides a cell signal processing circuit 24 includes a signal addition and read-out circuit 2 for adding a signal format for a dummy signal 4 to a cell end portion.

Figure 2:
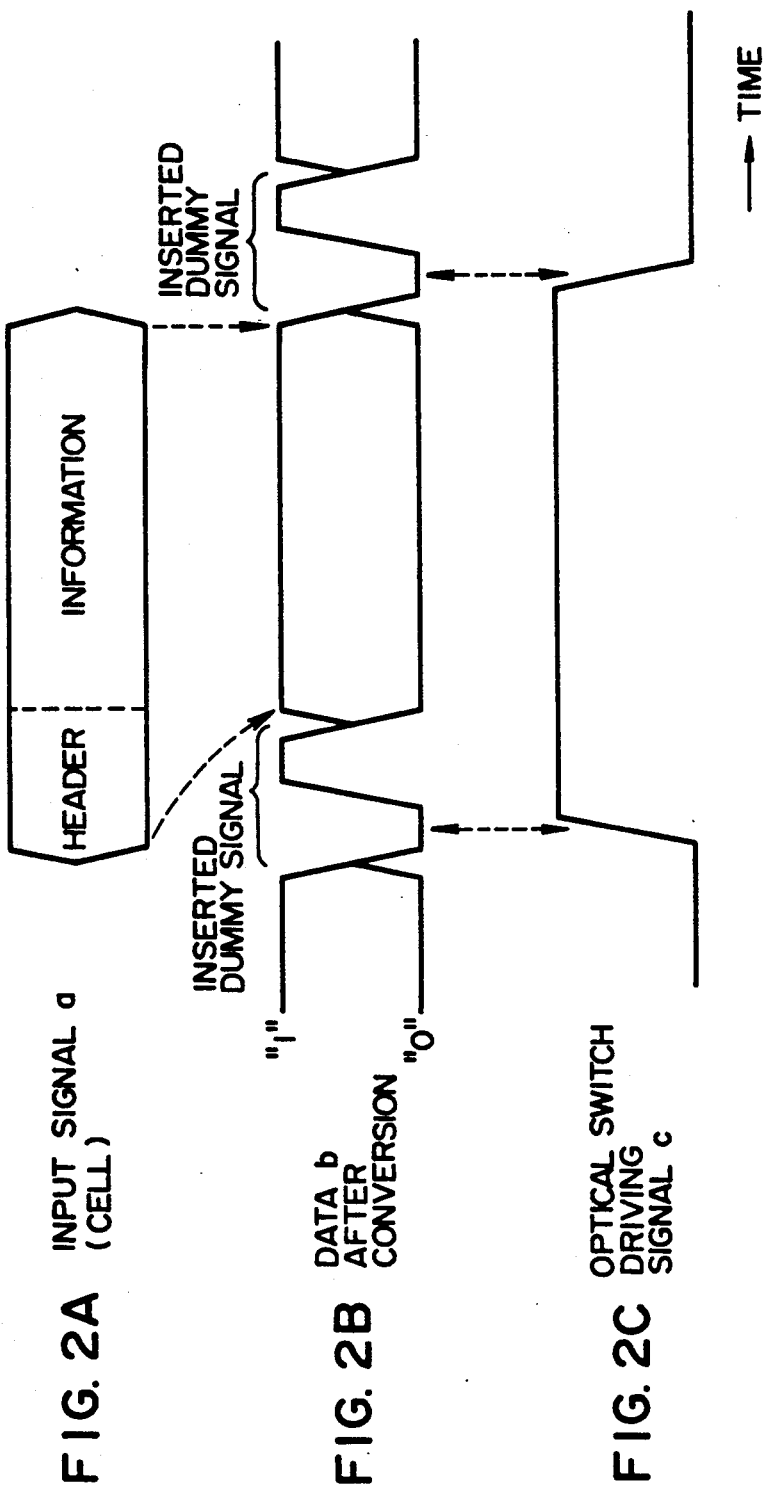
FIGS. 2A to 2C are timing charts used for explaining the operation of a main portion of the optical switch apparatus shown in FIG. 1.

Cell time series signals inputted from a plurality of input cables IN-1, . . . IN-n are multiplexed in cell units by multiplexer 1, temporarily stored into an input buffer memory 3 and supplied to a selector 5 in cell units according to a read-out command from the signal addition and read-out circuit 2. Incidentally, prior to a read-out operation, a dummy signal 4, as will be later explained with reference to FIG. 2, is also supplied to the selector 5 from the signal addition and read-out circuit 2. An output from the selector 5 is supplied to an optical switch array 8 through an electric-photo converter 6 in the form of an optical signal. The optical switch array 8 changes its pass arrangement cell by cell in a predetermined manner by a control signal from an optical switch control unit 7 included in the cell signal processing circuit 24. An optical output from the optical switch array 8 is converted to an electric signal by a photoelectric converter 9 and then supplied to a demultiplexer 12 through an amplifier 10 and a decision circuit 11. An output from the photoelectric converter 9 is supplied to a clock recovery circuit 13 and a cell synchronization circuit 14 and then supplied to the decision circuit 11 and the demultiplexer 12 as a clock signal and a cell synchronizing signal, respectively. Though not shown in the drawing, a header and information included in an input signal are both scrambled prior to being inputted to the electric-photo converter 6 so as to be converted substantially in a direct current balanced form. However, scrambling is not necessary if an information portion has been previously scrambled and a header portion, though not scrambled, is considered to be substantially in a direct current balanced state because of its short length.

FIGS. 2A to 2C are timing charts showing the operation of a main portion of the present embodiment. FIG. 2A shows a single cell signal within an input signal a for simplicity. As is well known, the cell signal comprises a header and information. FIG. 2B shows an output b from the selector 5 which comprises the cell signal read from the input buffer memory 3 and the dummy signal 4 added thereto. The dummy signal 4 is formatted to comprise the same plural number of bits "0" and "1". In the present embodiment, it is assumed that a signal switching at a rate of 1.2 Gb/s is performed and a guard time of 10 ns is provided for changing over the optical switch array 8, and therefore, the dummy signal 4 is determined to consist of 12 bits of "0" and another 12 bits of "1".

FIG. 2C shows a driving signal c for the optical switch array 8 generated from the optical switch control unit 7. As illustrated, the phase is adjusted so as to change over the optical switch array 8 at the center of the "0" bit sequence included in the dummy signal 4 which is added on the time base. Therefore, a data amplitude will not be fluctuated due to a change-over operation of the optical switch array 8, whereby the same waveform as FIG. 2B can be seen at the output end of the optical switch array 8. Therefore, the output signal from the photoelectric converter 9, the dummy signal and the cell signals are all in a direct current balanced state, which results in exhibiting no fluctuation in an identification level, thereby making it possible to employ generally well known decision circuit. The clock recovery circuit in turn extracts phase information from level changing points of a received signal to recover a clock. In this event, since the number of the signal level changing points is not increased, the clock recovery circuit will never malfunction. It is therefore possible to employ the structure from the ordinary photoelectric converter 9 to the decision circuit 11 shown in FIG. 1. Incidentally, a change-over of the optical switch array 8 is accompanied by reception of signals from different input ports, wherein these signals at the input ports are not completely in phase with one another so that it is regarded that a jitter is inputted from a viewpoint of the receiver side. However, since the jitter has a length of mere one bit at most and is averaged in a timing recovery circuit, it will not cause any problem. Also, since the direct current level of received signals is not fluctuated, the decision will not be deteriorated even if the received signals are not coupled directly.

Figure 3:
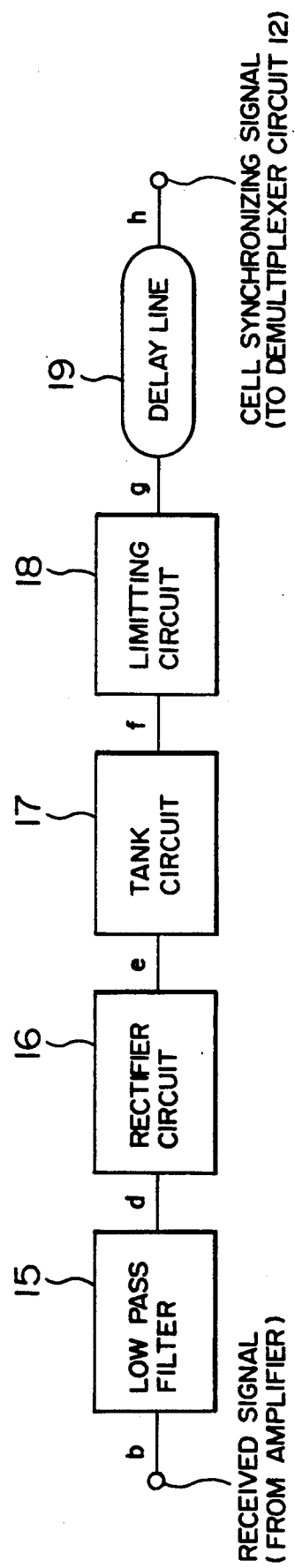
FIG. 3 is a block diagram showing an embodiment of a cell synchronization circuit appearing in FIG. 1.

FIG. 3 shows a structure of an embodiment of the cell synchronization circuit 14 shown in FIG. 1. Also, FIGS. 4A to 4F are timing charts used for explaining the operation of the cell synchronization circuit 14.

Figure 4:
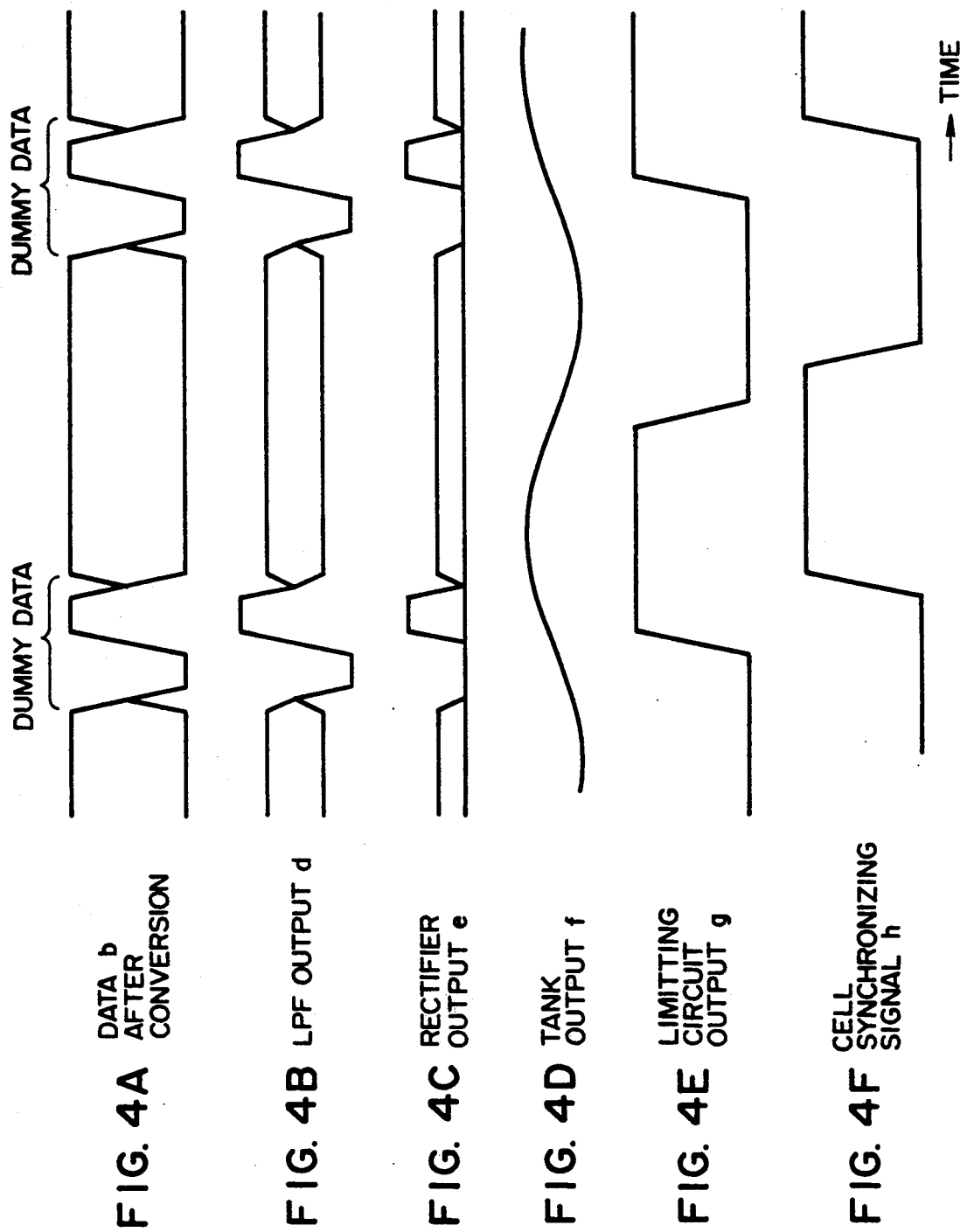
FIGS. 4A to 4F are timing charts showing the operation of the cell synchronization circuit.

A signal converted to an electric signal by the photoelectric converter 9 in FIG. 1 is amplified by the amplifier 10 to be a signal having a predetermined amplitude (FIG. 4A) and then filtered by a low pass filter 15 to remove high frequency components (data to be exchanged) (FIG. 4B). The unique signal pattern (dummy signal) has a long cycle pattern, and therefore exhibits little attenuation. Next, the signal shown in FIG. 4B is converted to a waveform of FIG. 4C by a rectifier circuit 16. This waveform has a frequency component equivalent to a cell switching cycle. This waveform is inputted to a tank circuit 17, which is tuned with the frequency of the cell switching cycle, to generate a sine wave (FIG. 4D) at that frequency. This sine wave is converted to a square wave (FIG. 4E) by a limiting circuit 18, applied with a necessary delay by a delay line 19 and then outputted to the demultiplexer 12 as the cell synchronizing signal (FIG. 4F).

As explained above, it is possible to generate the cell synchronizing signal from a received signal by adding the dummy signal having an unique bit pattern and also generate a signal synchronized with a received cell in phase, which results in facilitating a phase adjustment.

Figure 5:
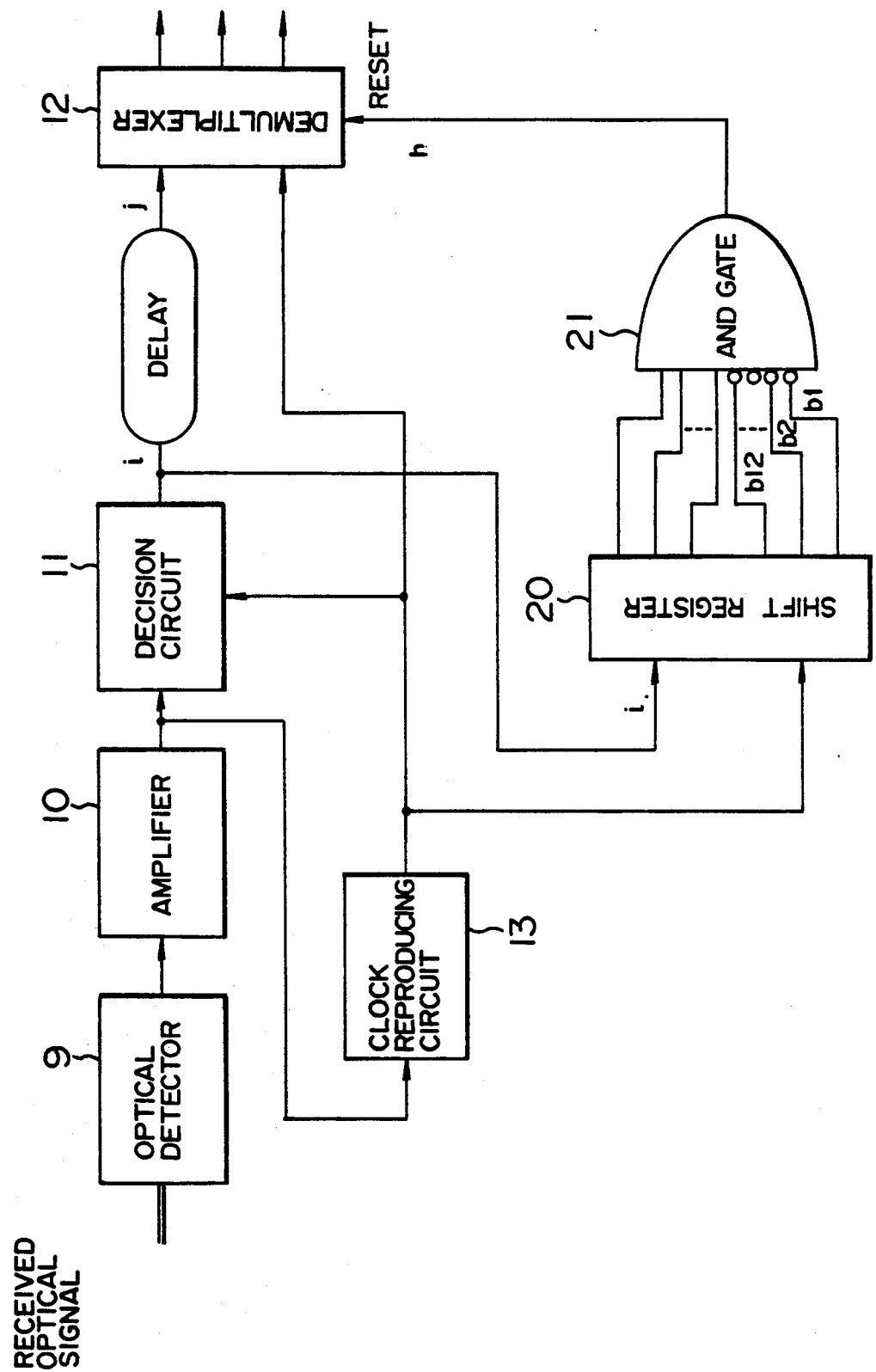
FIG. 5 is a block diagram showing another embodiment of an output section of an optical switch apparatus according to the present invention.
Figure 6:
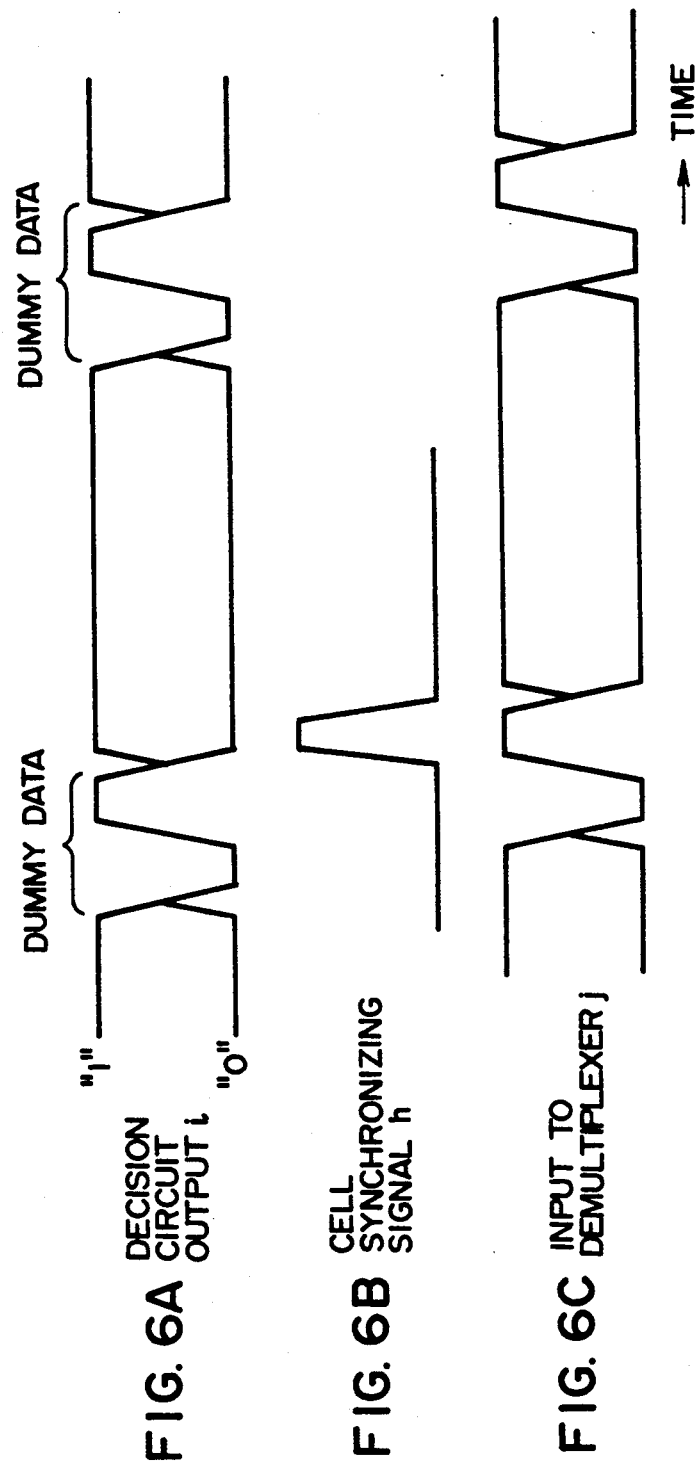
FIG. 6A to 6C is a time chart showing the operation of the embodiment shown in FIG. 5.
Figure 7:
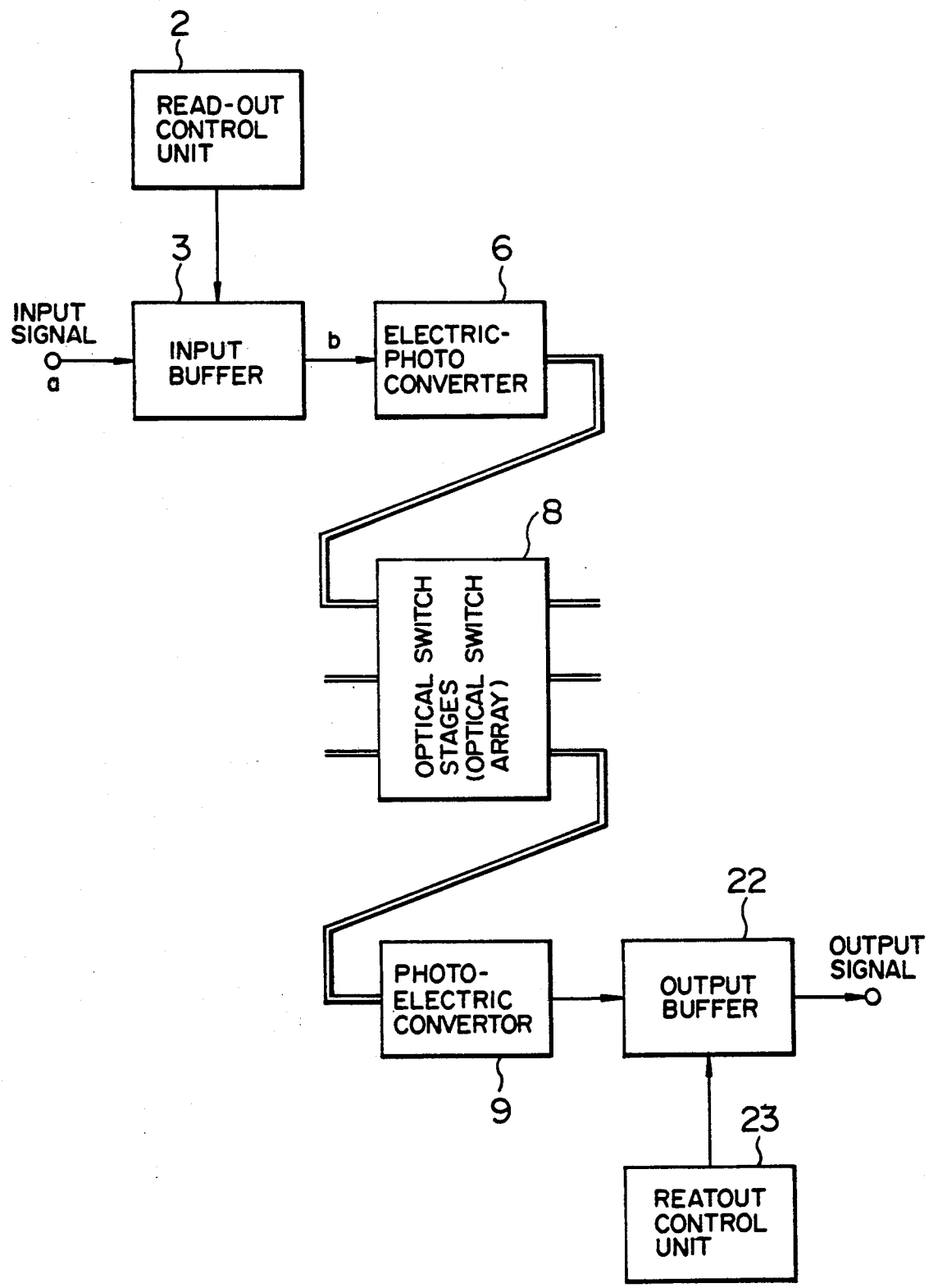
FIG. 7 is a general block diagram showing a conventionally known optical switch apparatus.

FIG. 5 shows a structure of another embodiment of a circuit including from the photoelectric converter 9 to the demultiplexer 12 of FIG. 1. In the drawing, parts having the same structure and function as those in FIG. 1 are designated the same reference numerals and an explanation thereof will be omitted. FIGS. 6A to 6C are timing charts used for explaining the operation of respective points in FIG. 5.

A part of an output (FIG. 6A) from the decision circuits 11 is inputted to a shift register 20 having 24 stages. It should be noted that the present embodiment also employs the same dummy signal as the aforementioned first embodiment, and cell signals to be exchanged are scrambled with a $(2^7-1)$ pseudo-random pattern. An output from the shift register 20 is inputted to a gate 21 for producing a logical AND. The gate 21 is constructed such that the upper 12 bits $b_1, b_2, \ldots, b_{12}$ thereof serve as inverting inputs. Therefore, an output h (FIG. 6B) becomes "1" only when an unique bit pattern ("0" is set to the upper 12 bits $b_1, b_2, \ldots, b_{12}$, and "1" is set to the lower 12 bits $b_{13}, \ldots, b_{23}, b_{24}$) is inputted to the gate 21. This output h is inputted to a reset terminal of the demultiplexer 12. Since the demultiplexer 12 begins functioning from a reset point, received signals can be precisely demultiplexed if the head of each cell is made to coincide with this reset point. As is understood from FIGS. 6A and 6B, the cell synchronizing signal h is located at the head of each signal to be exchanged (a propagation delay due to the gate and so on is ignored), so that it is necessary to delay a signal inputted to the demultiplexer 12 by one bit as shown in FIG. 6C.

According to the present embodiment shown in FIG. 5, the cell synchronizing signal can be generated by a simple logical circuit.

In the above embodiments, explanation has given of a case where the present invention is implemented in an optical switch apparatus, however, the present invention is not limited thereto, and it will be apparent that the present invention can be applied to a signal processing circuit which is adapted to separate time series cell signals in cell units and perform a signal processing at a high speed to again generate the time series cell signals.

According to the present invention, it is possible to simply and precisely construct a clock recovery circuit, a decision circuit and a cell synchronization circuit which are disposed in a signal processing circuit for separating time series cell signals in cell units and performing a signal processing at a high speed to again generate the time series cell signals.

We claim:

1. A cell signal processing circuit comprising:
    first means for adding dummy signals to an end portion of respective inputted time series cell signals, said dummy signals each comprising n "0" bits and n "1" bits, wherein n is an integer greater than one; and
    second means for separating said time series cell signals with said dummy signals added thereto at said "0" bits of respective dummy signals, processing the respective separated cell signals in cell units, and outputting the time series cell signals.

2. An optical switch apparatus for converting an inputted electric signal in the form of time series cells to an optical signal by an electric-photo converter, performing a change-over operation by optical switch means and exchanging the inputted signal, comprising:
    first means coupled to an input section of said electric-photo converter for adding dummy signals to an end portion of said respective input signal cells, said dummy signals each comprising n "0" bits and n "1" bits, wherein n is an integer greater than one, wherein said optical switch means separates said input signal cells with said dummy signals added thereto at said "0" bits of respective dummy signals, exchanges said separated cell signals in cell units, and outputs a time series optical signal.

3. An optical switch apparatus according to claim 2 further comprising, a photoelectric converter coupled to an output section of said optical switch means for converting said time series optical cell signal to an electric signal, a clock recovery circuit for extracting a clock signal from an output from said photoelectric converter, a cell synchronization circuit for extracting a cell synchronizing signal from an output from said photoelectric converter, and a decision circuit for deciding between signals in the output from said photoelectric converter by the use of the clock signal extracted by said clock recovery circuit.

4. An optical switch apparatus according to claim 3, wherein said cell synchronization circuit has a filter, being tuned with a switching cycle frequency, which comprises a circuit for extracting a cell cycle frequency component from said dummy signal.

5. An optical switch apparatus according to claim 4, wherein said dummy signal is composed of a sequence of bit signals "0" and a sequence of bits signals "1" having the same bit number as said sequence of bit signals "0".

6. An optical switch apparatus according to claim 3, wherein said cell synchronization circuit is supplied with a clock signal from said clock recovery circuit and an output from said decision circuit said cell synchronization circuit being formed of a logical processing circuit for detecting said dummy signal.

7. An optical switch apparatus according to claim 6, wherein said dummy signal is composed of a sequence of bit signals "0" and a sequence of bit signals "1" having the same bit number as said sequence of bit signals "0".

8. An optical switch apparatus according to claim 2, wherein said dummy signal is composed of a sequential bit signal "0" having a length longer than a time period required to change over said optical switch means and a phase deviation period among a plurality of optical cell signals inputted to said optical switching means and a sequential bit signal "1" having the same length as that of said sequential bit signal "0".

9. An optical switch apparatus comprising:
a multiplexer for multiplexing a plurality of electronic input cell signals;
a memory for storing the multiplexed cell signals;
a circuit for outputting an electronic dummy signal comprising n "0" bits and n "1" bits, wherein n is an integer greater than one;
a selector for combining the electronic dummy signal with an electronic cell signal read-out from the memory;
an electronic-optical converter for converting the combined electronic signal into a combined optical signal;
an optical switch array for changing a path of the combined optical signal at a "0" bit of the dummy signal;
an optical-electronic converter for converting the combined optical signal from the optical switch array into an electronic output signal;
a clock recovery circuit for extracting a clock signal from the electronic output signal;
a decision circuit for reshaping the electronic output signal as cell signals by use of the clock signal;
a cell synchronization circuit for extracting a cell synchronizing signal from the electronic output signal; and
a demultiplexer for demultiplexing the cell signals by use of the cell synchronizing signal and the clock signal.

10. An optical switch apparatus according to claim 9, wherein the cell synchronization circuit comprises a low pass filter for removing high frequency components of the electronic output signal, a rectifier circuit for rectifying the filtered signal, a tank circuit for extracting a sine wave signal from the rectified signal, a limiting circuit for extracting a square wave signal from the sine wave signal and a delay line for extracting the cell synchronizing signal by applying a necessary delay to the square wave signal.

11. An optical switch apparatus comprising:
a multiplexer for multiplexing a plurality of electronic input cell signals;
a memory for storing the multiplexed cell signals;
a circuit for outputting an electronic dummy signal comprising n "0" bits and n "1" bits, wherein n is an integer greater than one;
a selector for combining the electronic dummy signal with an electronic cell signal read-out from the memory;
an electronic-optical converter for converting the combined electronic signal into a combined optical signal;
an optical switch array for changing a path of the combined optical signal at a "0" bit of the dummy signal;
an optical-electronic converter for converting the combined optical signal from the optical switch array into an electronic output signal;
a clock recovery circuit for extracting a clock signal from the electronic output signal;
a decision circuit for reshaping the electronic output signal as cell signals by use of the clock signal;
a delay line for applying one bit delay to the cell signals;
a cell synchronization circuit for extracting a cell synchronizing signal from the cell signals using the clock signal;
a delay line for applying one bit delay to the cell signals; and
a demultiplexer for demultiplexing the delayed cell signals by use of the cell synchronizing signal and the clock signal.

12. A cell signal processing circuit comprising:
a first means for adding dummy signals comprising n "0" bits and n "1" bits to input cell signals and combining the dummy signals and the cell signals alternately, wherein n is an integer greater than one; and
a second means for separating the dummy signals and the cell signals at "0" bit positions of the respective dummy signals and processing the respective separated cell signals in cell units.

* * * * *